No. 667,559. Patented Feb. 5, 1901.
G. NEUBAUER.
FEEDING SCALE PREVENTIVES INTO BOILERS.
(Application filed Nov. 16, 1900.)
(No Model.)

WITNESSES:

INVENTOR
George Neubauer
BY
ATTORNEYS

THE NORRIS PETERS CO., PHOTO-LITHO., WASHINGTON, D. C.

UNITED STATES PATENT OFFICE.

GEORGE NEUBAUER, OF NEW YORK, N. Y.

FEEDING SCALE-PREVENTIVES INTO BOILERS.

SPECIFICATION forming part of Letters Patent No. 667,559, dated February 5, 1901.

Application filed November 16, 1900. Serial No. 36,703. (No model.)

*To all whom it may concern:*

Be it known that I, GEORGE NEUBAUER, a citizen of the United States, and a resident of the city of New York, borough of Manhattan, in the county and State of New York, have invented certain new and useful Improvements in Feeding Scale-Preventives into Boilers, of which the following is a full, clear, and exact description.

The object of the invention is to provide certain new and useful improvements in apparatus for feeding scale-preventives into steam-boilers, the apparatus being simple and durable in construction, very effective in operation, and arranged to permit the engineer to force more or less of the preventive into the boiler, according to the condition of the feed-water.

The invention consists of novel features and parts and combinations of the same, as will be fully described hereinafter and then pointed out in the claims.

A practical embodiment of the invention is represented in the accompanying drawings, forming a part of this specification, in which similar characters of reference indicate corresponding parts in all the views.

Figure 1:
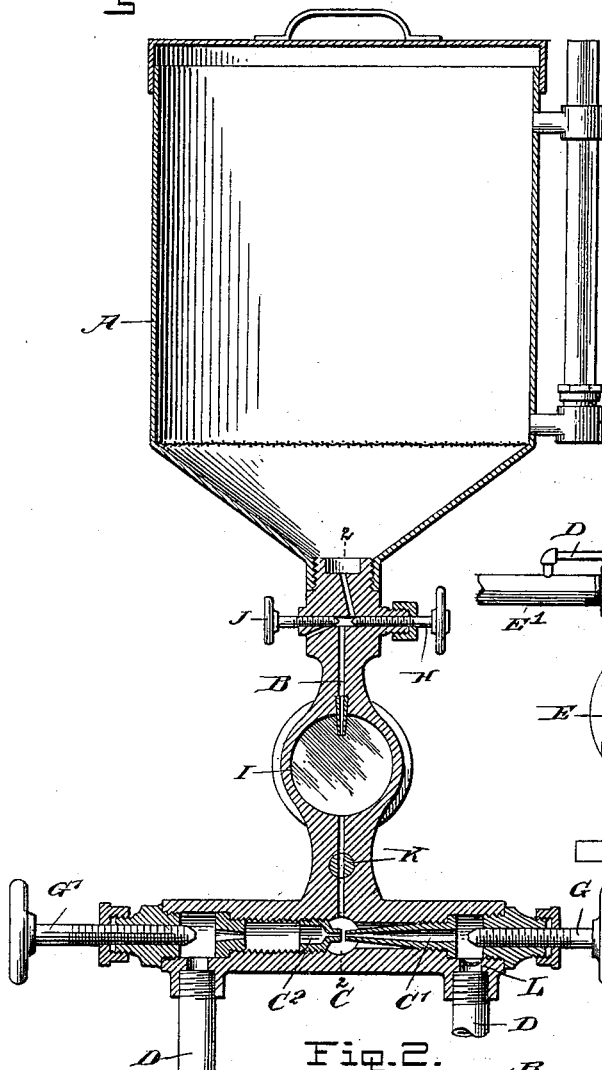
Figure 3:
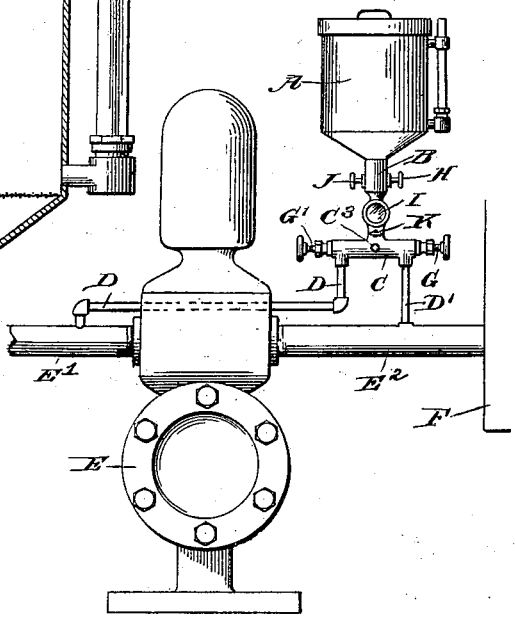
Figure 2:
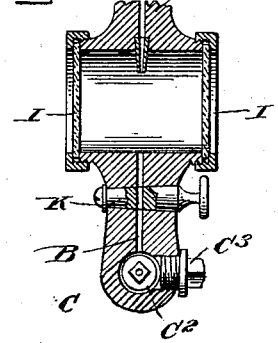

Figure 1 is an enlarged sectional side elevation of the improvement. Fig. 2 is a transverse section of the same on the line 2 2 in Fig. 1, and Fig. 3 is a reduced side elevation of the improvement as applied.

A suitable container A for holding the liquid scale-preventive connects by a passage B with an injector C, from which leads a pipe D to the suction-pipe $E'$ of the pump E of any approved construction and having the discharge-pipe $E^2$ connected with the boiler F to be supplied with feed-water. A pipe $D'$ connects the discharge-pipe $E^2$ with the injector C, so that when the feed-pump E is in operation a portion of the feed-water passes from the discharge-pipe $E^2$ through the pipe $D'$ into the injector-nozzle $C'$ and through the same into and through the receiving-nozzle $C^2$, to then pass to the pipe D and to the suction-pipe $E'$ of the feed-pump.

By the water passing from the nozzle $C'$ to the nozzle $C^2$ a suction is created, so that the scale-preventive is drawn by the passage B from the container A into the injector to mix with the water and pass with the same through the nozzle $C^2$ and pipe D into the feed-water passing to the feed-pump E. The water thus charged with liquid scale-preventive passes into the boiler with the feed-water. Thus it will be seen that in order to operate the apparatus no further machinery is needed, as the feed-pump itself furnishes the necessary motive agent to actuate the apparatus.

As shown in the drawings, suitable valves G and $G'$ are employed for regulating the flow of feed-water through the injector C, and a valve H is arranged in the passage B to control the amount of liquid scale-preventive passing from the container A to the injector. The passage B is also provided with glass panes I to permit of viewing the amount of scale-preventive passing from the container to the injector, and in the said passage is also arranged an air-valve J to allow atmospheric air to pass to the injector in case of undue pressure at the injector-nozzles $C'$ and $C^2$. A valve K is also arranged in the passage B to immediately close the latter when the pump is stopped, so that water cannot back up in the passage and pass into the container. By closing the valve K it is not necessary to close the valves G $G'$ when the pump and injector are not in operation. The injector-nozzle $C^2$ is adjustable toward and from the nozzle $C'$ to allow proper adjustment between the nozzle for the vacuum or suction required, and access is had to the said nozzle by a screw-plug $C^3$, screwing in one side of the injector-casing. The injector is preferably provided with a sieve L to prevent foreign matter from clogging the injector.

Having thus fully described my invention, I claim as new and desire to secure by Letters Patent—

1. An apparatus for feeding scale-preventives into boilers, consisting of an injector connected at the inlet with the discharge of a boiler feed-pump and at the outlet with the suction of the boiler feed-pump, and a container for the scale-preventive, discharging into the said injector, as set forth.

2. An apparatus for feeding scale-preventives into boilers, consisting of an injector connected at the inlet with the discharge of a boiler feed-pump and at the outlet with the suction of the boiler feed-pump, a container for the scale-preventive, discharging into the said injector, and means for regulating the supply of preventive from the container to the injector, as set forth.

3. An apparatus for feeding scale-preventives into boilers, consisting of an injector connected at the inlet with the discharge of a boiler feed-pump and at the outlet with the suction of the boiler feed-pump, a container for the scale-preventive, discharging into the said injector, and an air-valve for admitting air to the injector in case of back pressure at the injector-nozzles, as set forth.

4. An apparatus for feeding scale-preventives into boilers, comprising an injector connected at the inlet-nozzle with the discharge of the boiler feed-pump and at the outlet-nozzle with the suction of the boiler feed-pump, a container for containing the scale-preventive, a passage connecting the said container with the injector, a glass pane interposed in the said passage, and a valve for regulating the amount of scale-preventive that passes from the container to the said injector, as set forth.

In testimony whereof I have signed my name to this specification in the presence of two subscribing witnesses.

GEORGE NEUBAUER.

Witnesses:
  JOHN YOUNG,
  ALBERT RIMMELIM.